United States Patent
Theis

(10) Patent No.: US 6,870,927 B1
(45) Date of Patent: *Mar. 22, 2005

(54) AUTOMATIC AREA CODE DETECTOR AND DIALER FOR AUTOMATICALLY SELECTING, PREPARING AND ENTERING SUPPLEMENTAL INFORMATION TO COMPLETE AN ADDRESS

(76) Inventor: Peter F. Theis, 3203 Bay View La., McHenry, IL (US) 60050

( * ) Notice: Subject to any disclaimer, the term of this patent is extended or adjusted under 35 U.S.C. 154(b) by 738 days.

This patent is subject to a terminal disclaimer.

(21) Appl. No.: 09/757,761

(22) Filed: Jan. 9, 2001

Related U.S. Application Data

(63) Continuation-in-part of application No. 09/290,010, filed on Apr. 10, 1999, now Pat. No. 6,201,864, which is a continuation of application No. 08/440,008, filed on May 21, 1995, now Pat. No. 5,917,904.

(51) Int. Cl.$^7$ .............................. H04M 3/42; H04M 1/00
(52) U.S. Cl. ............................ 379/355.01; 379/201.01; 379/201.02; 379/355.09; 379/355.1
(58) Field of Search ..................... 379/355.01, 355.02, 379/355.03, 355.04, 355.05, 355.08, 356.01

(56) References Cited

U.S. PATENT DOCUMENTS

| | | | | |
|---|---|---|---|---|
| 4,945,557 A | * | 7/1990 | Kaneuchi et al. | 379/88.03 |
| 5,157,719 A | * | 10/1992 | Waldman | 379/355.05 |
| 5,305,372 A | * | 4/1994 | Tomiyori | 455/564 |
| 5,459,774 A | * | 10/1995 | Breeden | 455/566 |
| 5,475,743 A | * | 12/1995 | Nixon et al. | 379/355.07 |
| 5,568,546 A | * | 10/1996 | Marutiak | 379/355.05 |

\* cited by examiner

Primary Examiner—Huyen Le
Assistant Examiner—Tuan Pham

(57) ABSTRACT

The present invention comprises four principal elements: (1) a telephone instrument; (2) a computer; (3) an automatic dialer; and (4) a telephone line. These elements allow for automatic dialing of local and long distance calls in the United States, as well as automatic dialing of international calls. The automatic dialing feature is accomplished, in part, by implementing a computerized data base grouped in N-files. These files may be searched by the computer system during and after the caller dials a number. If the dialed number matches one of the numbers in the files, the system may automatically out-dial the dialed number. The present invention also relates to a system for automatically selecting, preparing and entering supplemental information to information entered to completed or change an alphabetic, alphanumeric or numeric address.

5 Claims, 8 Drawing Sheets

US 6,870,927 B1

AUTOMATIC AREA CODE DETECTOR AND DIALER FOR AUTOMATICALLY SELECTING, PREPARING AND ENTERING SUPPLEMENTAL INFORMATION TO COMPLETE AN ADDRESS

CROSS-REFERENCE TO RELATED APPLICATIONS

The present application relates to, claims the priority of, and is a continuation-in-part of U.S. patent application Ser. No. 09/290,010 filed on Apr. 10, 1999 now U.S. Pat. No. 6,201,864, which, in turn, in a continuation of 08/440,008 filed May 21, 1995 now U.S. Pat. No. 5,917,904. The present application is assigned to the same assignee as the related U.S. patent application Ser. No. 09/290,010 and U.S. Pat. No. 5,917,904, both of which are incorporated herein by reference in their entirety.

BACKGROUND OF THE INVENTION

The present invention relates generally to a system for automatically dialing a dialed number and a switching code, which is used for routing calls and may include 1+, area codes, international access codes, including foreign country and foreign city codes, and other information that is determinative of the routing of a telephone call. More particularly, the present invention relates to a system for automatically selecting and dialing the proper switching code for a dialed number. Still more particularly, the invention relates to a system for automatically selecting, preparing and entering supplemental information to information entered to complete or change an alphabetic, alphanumeric, or numeric address.

With current technology, there are several ways to automatically select the proper switching code for a dialed number. One relatively simple way is to use phones that utilize a memory dialer. Under this system, a long distance or long number can be automatically selected from a pre-entered directory by dialing an abbreviated name, telephone number or code. Other systems have data bases that are constructed based on manually pre-entered names and addresses.

U.S. Pat. Nos. 4,341,929, 4,633,041, 4,723,265, 4,736,410, 4,800,582, 4,839,919, 4,908,853, 5,134,653, and 5,157,719 provide an overview of patented devices relating to the subject matter of the present invention. U.S. Pat. No. 5,157,719 teaches a system that stores the last area code dialed and displays that area code after the system detects the start of the next call. The caller may then select the last area code dialed, riot use it so that the call becomes local, or enter a new area code. U.S. Pat. No. 5,134,653 teaches an automatic speed dialing device for facsimile machines. The device utilizes coded numbers to represent larger string telephone numbers that are stored in the system. U.S. Pat. No. 4,908,853 teaches a speed dialing apparatus that displays selected names and numbers stored in a memory. The operator can use a selector key to instruct the apparatus to dial the desired number appearing on the display. U.S. Pat. No. 4,736,410 teaches a system that cross links a stored telephone number with a coded number.

SUMMARY OF THE INVENTION

The present invention comprises four principle elements: (1) a telephone instrument; (2) a computer; (3) an automatic dialer; and (4) a telephone line. The present invention may be used for a particular telephone subscriber or a particular telephone number. The means to effect the present invention can be located near or in a caller's telephone instrument, a PBX, or a telephone company central office. Additionally, the present invention can be used with both wireless and wire telephones. The preferred embodiment of the present invention is a system for automatically dialing local and long distance calls in the United States. However, the same system could also be used for dialing international calls as well.

The computer contains the system of the present invention which includes a data base grouped into N-files. These files may be searched by the computer system during and after the caller dials a number. The system first determines during dialing whether the dialed number exactly corresponds to any of the restricted numbers in File 2, which stores numbers that have been selected for special handling. If the dialed number matches one of the restricted numbers, the system will either automatically out-dial the dialed number or the system will abort the call, depending on whether the dialed number is subject to automatic dialing.

If the dialed number does not match one of the restricted numbers, the system determines whether the first digit dialed was a 1. If the first digit dialed was a 1, the system will then determine whether ten additional digits have been dialed. In the event that ten additional digits were not dialed, the system will abort the call. On the other hand, if ten additional digits were dialed, the system out-dials the eleven digit number and stores the out-dialed number in the front of File 1, which stores one of each of the numbers that previously has been dialed. In this manner, File 1 is continuously and automatically updated as numbers are out-dialed.

If the system determines that the first digit dialed is not a 1, the system will then determine whether seven digits have been dialed. In the event that seven digits were not dialed, the system will abort the call. On the other hand, if seven digits were dialed, the system determines whether the right hand most seven digits of any number in File 1 match the dialed number. If there is a match and the caller approves the number to be dialed, the system out-dials the number and moves the out-dialed number to the front of File 1.

If there is a match and the caller rejects the number but elects to continue the search or if there is no match, the system will then determine whether the prefix of the seven digit dialed number is located in File 3, which stores all of the prefixes in the caller's local area code. If the prefix of the dialed number appears in File 3 and the caller approves the number to be dialed, the system out-dials the number and moves the out-dialed number to the front of File 1. If there is a match and the caller rejects the number but elects to continue the search or if there is no match, the system will then determine whether the prefix of the dialed number is located in the highest priority outside area code file, which stores the prefixes of the highest priority outside area code. The system proceeds through each of the N-priority outside area code files, in the same manner described above, until a match is approved and the 1+area code with the number dialed is out-dialed and stored in File 1 or until the last file has been searched without a match. The process may be interrupted, of course, if the caller hangs up or the telephone line is no longer available.

In accordance with the above description, the data base of the system of the present invention need only contain area codes and telephone numbers, and the system need not cross link any of these numbers with a caller selected name, abbreviated name or code number. Additionally, the system continually updates and alters the data base by storing previously dialed numbers in File 1. The concept of linking a particular telephone number to its area code based on (1) the combination of the number and area code having been previously dialed, and (2) based on the available exchange prefix in selected area codes is novel.

These and other characteristics and advantages of the present invention will become readily apparent to those skilled in the art upon reading the following detailed description and claims and by referring to the accompanying drawings.

BRIEF DESCRIPTION OF THE DRAWINGS

For a more detailed description of the preferred embodiment of the invention, reference will now be made to the accompanying drawings, wherein.

DETAILED DESCRIPTION OF THE PREFERRED EMBODIMENT

Figure 1A:
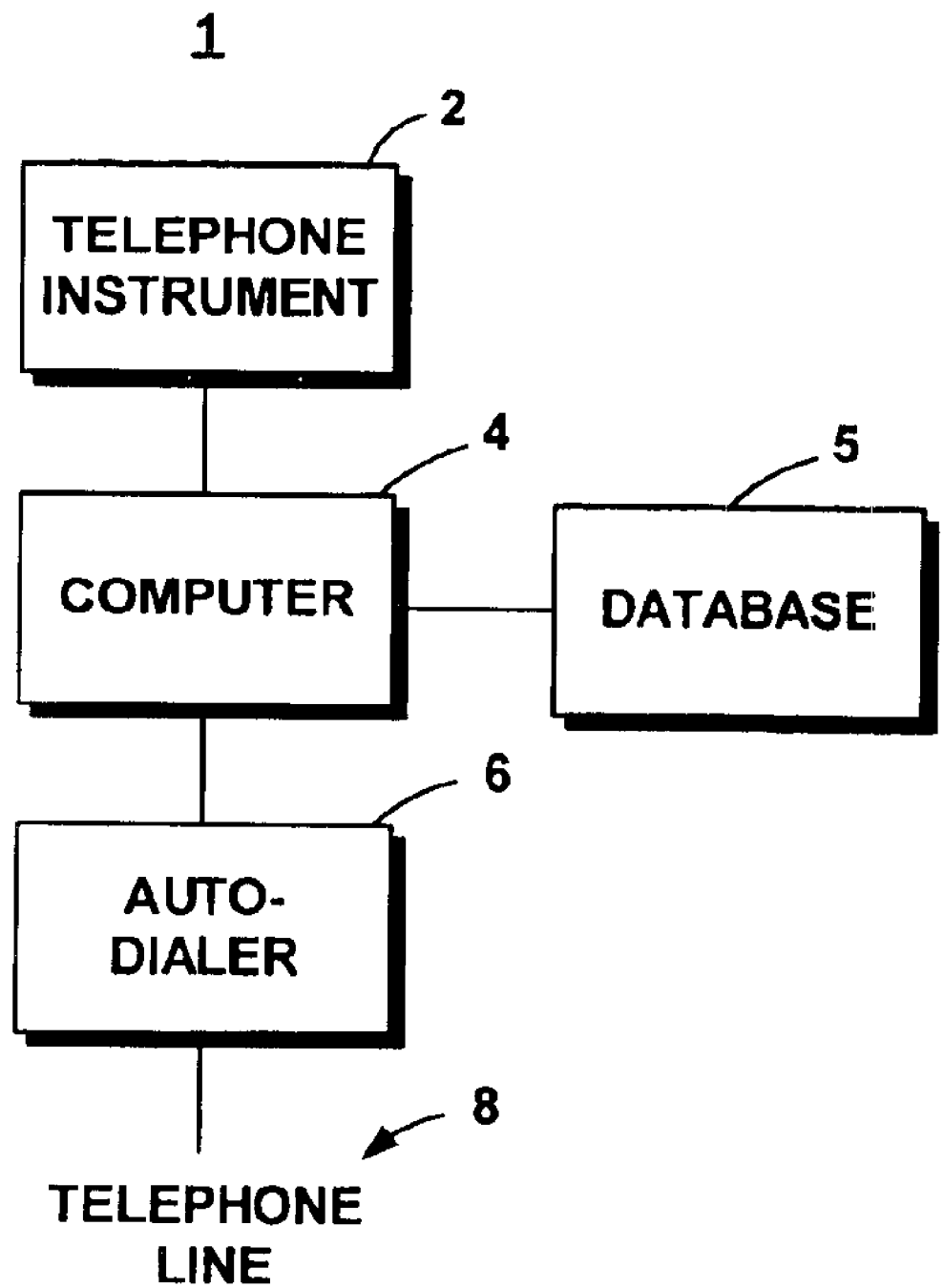
FIG. 1A shows an automatic area code detector and dialer system in accordance with the preferred embodiment.

Referring now to FIG. 1A, a block diagram depicting the present invention is shown. The present invention comprises four principal elements: (1) a telephone instrument 2; (2) a computer 4; (3) an automatic dialer 6; and (4) a telephone line 8. The telephone instrument 2 may be a conventional telephone or an instrument with a display. The computer 4 implements the system and methodology of the present, invention, and the automatic dialer 6 preferably comprises an interface card, which can out-dial numbers. Such interface cards are commonly available and are made by Natural Microsystems, Inc. (Model VBX 100 or VBX 400) and Dialogic Corporation.

In the preferred embodiment, the telephone type instrument 2 is connected to the computer 4. Alternatively, the telephone instrument 2 and the computer 4 can be integrally self contained. Accordingly, the computer 4 can be located near or in the caller's telephone instrument. Alternatively, the system of the present invention could be part of a PBX system or located at the telephone company central office. Additionally, one skilled in the art will recognize that the present invention could be used with cellular phones, Internet addresses, and television channel lockups, and will also recognize that the principles of this invention are applicable to any application involving repetitive lookups from a large data base.

The computer 4 is preferably connected to either an external or internal telephone line interface card 6, which is connected to a telephone line 8. The interface card can be connected to a wide range of telephone lines. In accordance with this design, the telephone instrument 2 controls the computer 4, and the computer 4, through the interface card 6, controls the telephone line 8.

The computer 4 of the present invention includes a data base grouped into N-Files. File 1 preferably contains each of the numbers that have most recently been dialed. The numbers are complete with a one and the switching code where applicable. If a number was dialed several weeks ago, and the same number is dialed again, the system of the present invention will move the dialed number to the chronological front of File 1 and the dialed number will only be entered once in the data base. In this way, the most commonly used numbers are always stored by the system near the chronological front of File 1 and the most recently dialed number will be placed at the front of the file.

Because computer memory has finite limits, it may be necessary to limit the number of telephone numbers stored in File 1. Thus, if the list of numbers becomes too extensive, the system will delete the numbers at the back of the file, which indicates that these numbers have not been used recently. Such memory management minimizes the memory required, the search time, and the processing time by (a) deleting the oldest dialed numbers, and (b) maintaining the file so that each phone number only appears once. Memory management is further minimized in the present invention by not adding indexing files, or sequencing or chronology information with the stored telephone number. There are other techniques for accomplishing this objective, and the particular technique described is only a model.

For illustrative purposes only, an example of numbers that might be found in File 1 is shown below:

1-312-876-3849
1-815-261-4736
1-217-431-2843
882-3164
1-415-371-5993
781-3811
882-2490
1-708-249-9773
and other numbers dialed.

In this specific example, the number 1-312-876-3849 was the last out-dialed number and thus, is placed at the "chronological front" of File 1 (or in the initial address location of File 1). The number 1-815-261-4736 was out-dialed immediately prior to 1-312-876-3849 and the number 1-217-431-2843 was out-dialed immediately prior to 1-815-261-4736. As illustrated by the example, the most recently out-dialed number is stored at the chronological front of File 1. In this manner, the out-dialed numbers are stored in a specific sequence in File 1, which is continually and automatically updated as numbers are out-dialed.

To solve the problem of having a wrong number entered into the data base, the system of the present invention can monitor the length of a call, or whether the call was completed. If the call was less than 15 seconds, for example, the number will not be stored in the data base. If the system has access to call completion information, such as if it is installed as part of a Central Office system, then the system will enter the number in the data base only of the call was completed. Other methods are available and known to those skilled in the art to detect call completion.

One skilled in the art will also recognize that in lieu of storing the out-dialed numbers in a particular sequence in File 1, a chronological indexing scheme could be used. In such a scheme, the out-dialed numbers may be stored in a particular location with a corresponding index or key number. Another scheme would be to maintain a file with each number called associated with a time and date of the call. This file may or may not be maintained in random order. When a call is placed to a number already in the file, the time and date would be updated. Thus, to limit the size of the file, those numbers called with the oldest time and date would be deleted in order to clear memory. The method of maintaining this file is well known by those skilled in the art File 2 preferably includes numbers that have been selected for special handling. For example, if the number 555-1212 were dialed, it would be rejected due to the lack of a switching code. Similarly, numbers such as 911, 411, and 611 would be dialed without going through the computer switching code matching. Any number starting with "0" might also be automatically dialed without referencing any files followed by connecting the caller directly to the line to finish dialing. However, "0" could be handled similar to a 1+number. For illustrative purposes only, an example of numbers that might be found in File 2 is shown below:

555-1212 (Information)
911
411
611
0+

In the preferred embodiment, File 3 comprises a plurality of fields and contains all the prefixes in the user's local area code, which is the switching code for File 3. The prefixes are published information and each field in File 3 contains a prefix. An example of File 3 is shown below:

201
202
203
204
206
207
214
220
221
222
223 and other prefixes in the local calling area code.

File 4, which comprises a plurality of fields, preferably includes all the prefixes in a first priority outside area code, which is the switching code for File 4. The initial field in File 4 is 1 plus the area code. Each of the following fields contains a prefix from the first priority outside area code. An example of File 4 is shown below:

Area Code: 1-815
329
332
334
335
337
338
339
341 and other prefixes in first priority outside area code.

File 5 preferably includes all the prefixes in a second priority outside area code, which is the switching code for File 5. The initial field in File 5 is 1 plus the second priority outside area code. Each of the following fields contains a prefix from the second priority outside area code. An example of File 5 is shown below:

Area Code: 1-219
261
262
263
264
265
266
267
268 and other prefixes in the second priority outside area code.

Similarly, each additional file contains al the prefixes in the corresponding outside area codes, which are the switching codes for these files. For example, File N, which is the last file, contains all the prefixes in the last priority outside area code. The initial field in File N is 1 plus the last priority outside area code. Each of the following fields in File N contains a prefix from that last priority outside area code. Organizing the data base in this fashion allows each of the desired area codes and their corresponding prefixes to be contained in separate files. It should be noted that, except for File 1 which stores numbers in a specific sequence, the files do not have to include the numbers in any particular order.

Additionally, one skilled in the art will recognize that files containing other switching codes (e.g. international access codes, foreign country codes and foreign city codes) and their corresponding local numbers or prefixes can be added to the data base in order to expand the capability of the preferred embodiment. One skilled in the art will recognize, therefore, that although the preferred embodiment is based on the 1+area code system in the United States, the system could easily be expanded to route calls to foreign countries by adding files containing other switching codes.

In operation, when the caller takes the phone 2 off hook, the computer 4, through the interlace card, takes the telephone line 8 off hook to prevent an incoming call from seizing the line 8. Numbers are not out-dialed as the caller dials them, but rather as the computer 4 performs is routine of searching the files and out-dials them through an interface card.

Figure 2A:
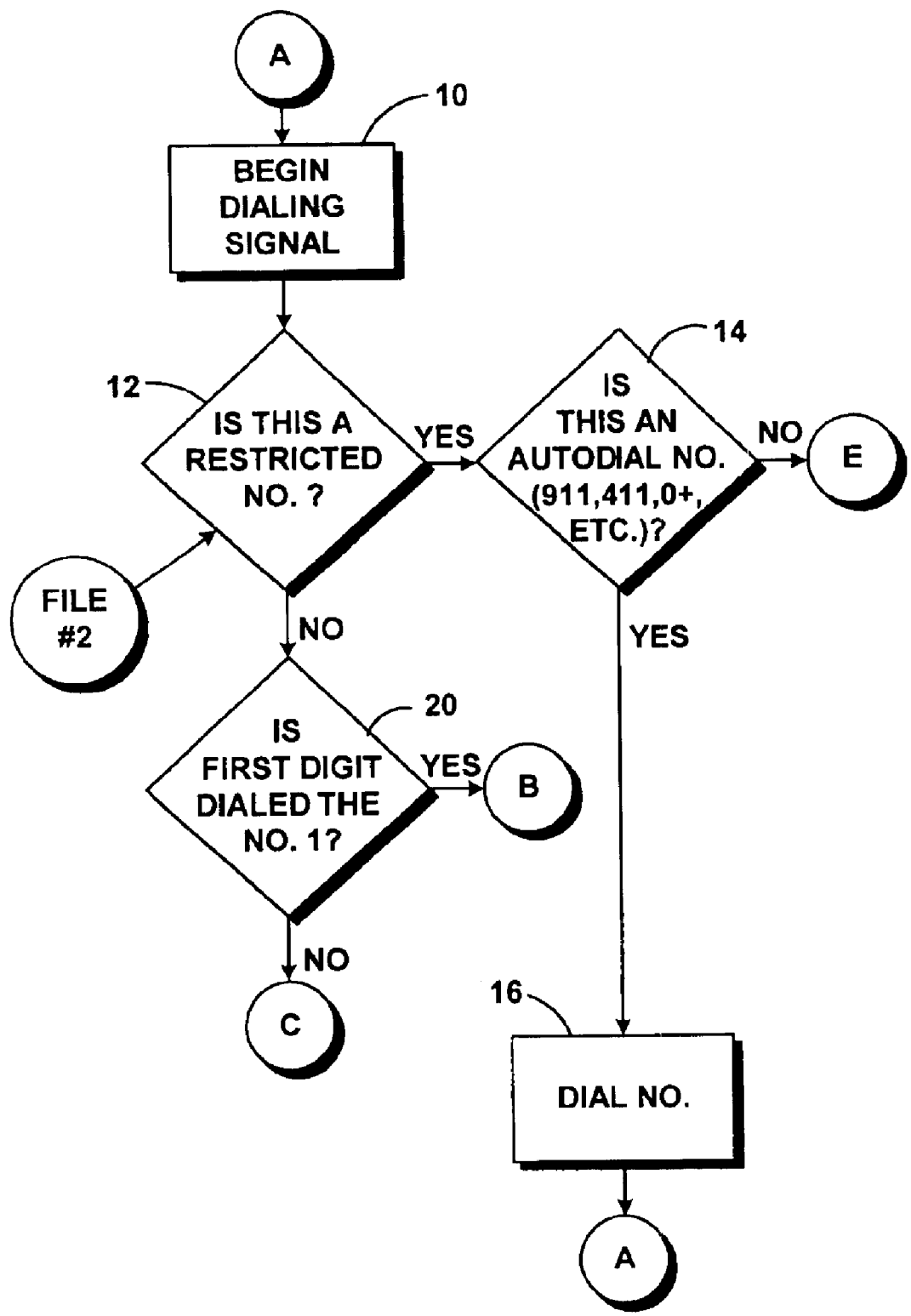
FIGS. 2A–2G comprise a flowchart illustrating the operation of the systems of FIGS. 1A through 1C.

Referring now to FIG. 2A, the operation of the system of the present invention begins at Point A. The dialing process starts when the caller dials a number in step 10. This process typically includes indicating that an outbound call is to be made, and then dialing the desired number. A common way to indicate the beginning of an outbound call is for the phone 2 to go off hook, and the cereal telephone office to respond with a dial tone. Alternatively, other telephone instruments could indicate that the phone is ready to out-dial by using a visual display or a different mode of auditory signal.

As the caller dials a number in step 10, the system first determines in step 12 whether the sequence of dialed numbers exactly corresponds to any of the restricted numbers in File 2. As previously explained, File 2 contains numbers for telephone services that are area code independent (e.g., 911, 611 and 411), and numbers for which the area code, but not the seven digit number, change with each call (e.g., 1-XXX-555-12112). If the dialed number matches one of the restricted numbers, the system will then determine in step 14 whether the dialed number is subject to automatic dialing. If the dialed number is subject to automatic dialing, the number will automatically be out-dialed in step 16 without further involving the system. As shown in step 14, area code independent numbers, such as 911, 411, and 0+, are all automatically out-dialed in step 16. If, on the other hand, the dialed number is not one that can be out-dialed, the call will be aborted by the system at Point E, shown in FIG. 2E.

Figure 2B:
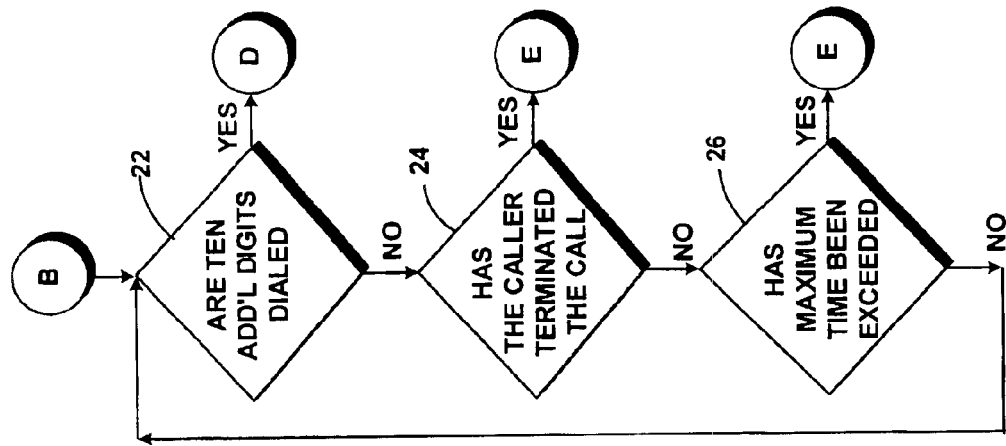
Figure 2C:
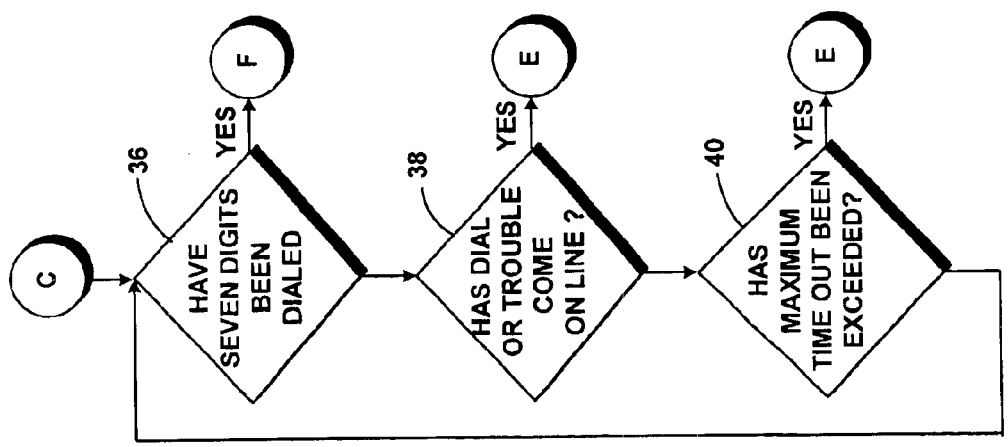
Figure 2D:
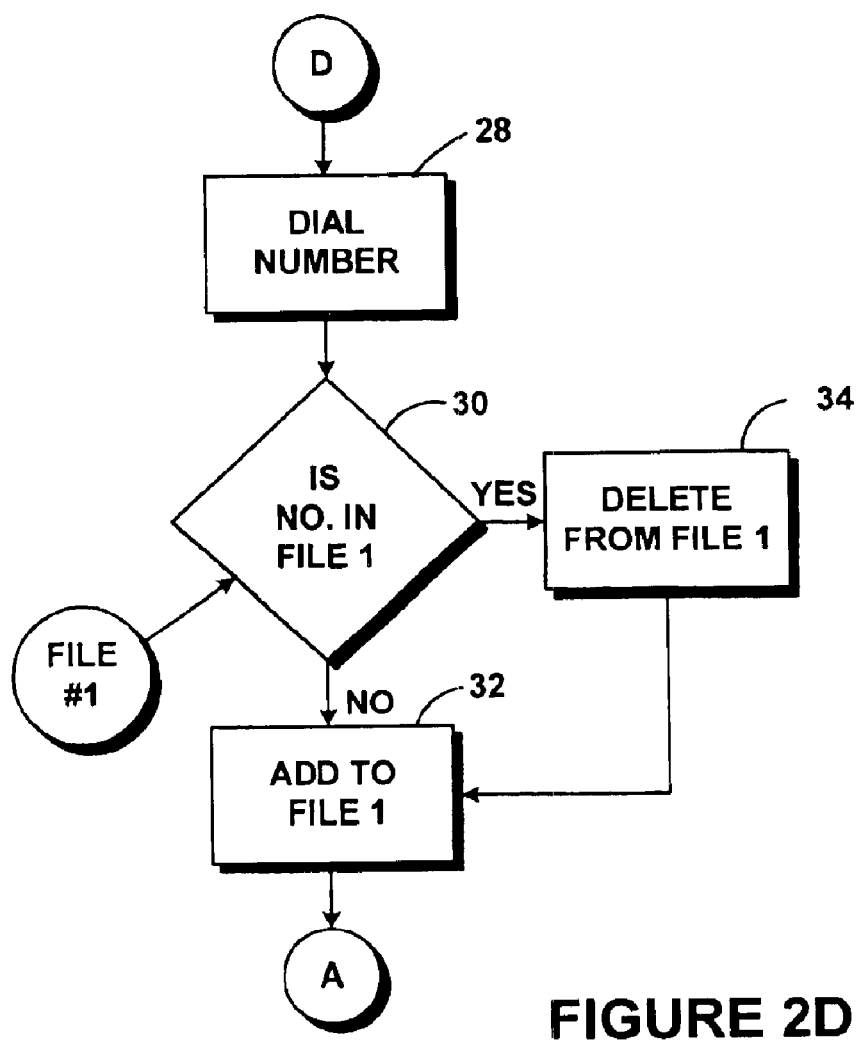
Figure 2E:
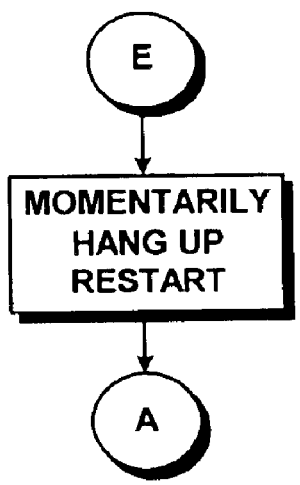

Referring to FIG. 2E, one way to abort a call is for the caller to momentarily hang up the telephone 4. Another way to abort the call is for the system to hang up or remove the dial tone. The computer can then either display an error message on the telephone, give an audio message or provide a distinctive tone so that the caller knows the call must be started again. Alternatively, the computer may connect the caller to the telephone line directly so that the caller can hear the trouble recording. Such systems are currently available with telephone systems that block calls to specified numbers. Once the call has successfully been aborted, the system returns to Point A and the dialing process begins anew.

Referring again to FIG. 2A, if the dialed number does not match one of the restricted numbers in File 2, the system determines in step 20 whether the first digit dialed was a 1, which indicates a long distance call. In those areas where 1+dialing is not utilized to indicate a long distance call, the determination in step 20 would be based on whether the second digit dialed is either a 0 or 1. The technology, in any event, should be similar to that used in PBX systems, or the central office to differentiate a local prefix from an area code. Another alternative is to wait for several seconds after dialing, and once that period of non-dialing has occurred, process the call as if all numbers had been dialed. If there are ten numbers, the call is treated the same as a 1+call. Otherwise, the call is treated as a non 1+call.

If the system determines in step 20 that the first number dialed is a 1, then the system goes to Point B, shown in FIG. 2B. Referring to FIG. 2B, the system then determines in step 22 whether ten additional digits have been dialed, i.e., the caller has dialed 1+area code+seven digits. If ten additional digits have not been dialed, the system will determine in step 24 whether the caller has terminated the call (the caller has hung up) or the telephone line is no longer available (the dial tone has disappeared, or a trouble recording, "We're sorry . . . ", has been triggered). If either of these events has occurred, the call will be aborted by the system at Point E and the system will return to starting Point A. On the other hand, if neither of these events has occurred, the system will determine in step 26 whether the maximum delay time for dialing has been reached. A common delay time might be 20 seconds. An alternative delay period would be 20 seconds after the last digit dialed. If the delay period expires without the caller dialing ten additional digits, the call is aborted by the system at Point E and the system returns to starting Point A. At this point, the caller must start the dialing process anew as shown in FIG. 2E.

If none of these aborting events occurs and the system recognizes in step 22 that 1 plus ten digits have been dialed, the system goes to Point D, shown in FIG. 2D. Referring to FIG. 2D, the system then out-dials the eleven digit number in step 28. Alternatively, if the caller has inadvertently dialed one plus his own local area code (plus a seven digit local number), the system has the capability to recognize that the dialed area code is unnecessary, at which point the system will automatically omit the one plus area code when out-dialing the seven digit number. After out-dialing the number, the system determines in step 30 whether the out-dialed number is in File 1, i.e., whether the out-dialed number matches one of the numbers in File 1. If the out-dialed number is not found in File 1, the system in step 32 adds the out-dialed number with 1+ the area code at the chronological front of File 1. The system then goes to Point A, at which time the system is ready when the next number is dialed. If the out-dialed number is found in File 1, i.e., there is a match, the system in step 34 deletes the number from File 1 and then, in step 32, relocates the out-dialed number at the front of File 1. As described above, the system then goes to Point A, at which time the system is ready when the next number is dialed.

Referring again to FIG. 2A, if the system determines in step 20 that the first digit dialed is not a 1, i.e., the first digit is not indicative of a long distance call, then the system goes to Point C, shown in FIG. 2C. Referring to FIG. 2C, the system then determines in step 36 whether seven digits have been dialed. If seven digits have not been dialed, the system will determine in step 38 whether the caller has terminated the call or the telephone line is no longer available. If either of these events has occurred, the call will be aborted by the system at Point E and the system will return to starting Point A. If neither of these events has occurred, the system will then determine in step 40 whether the maximum delay time for dialing has been reached. If the delay period expires without the caller dialing seven digits, the call is aborted by the system at Point E. At this point the caller must start the process anew as shown in FIG. 2E.

Figure 2F:
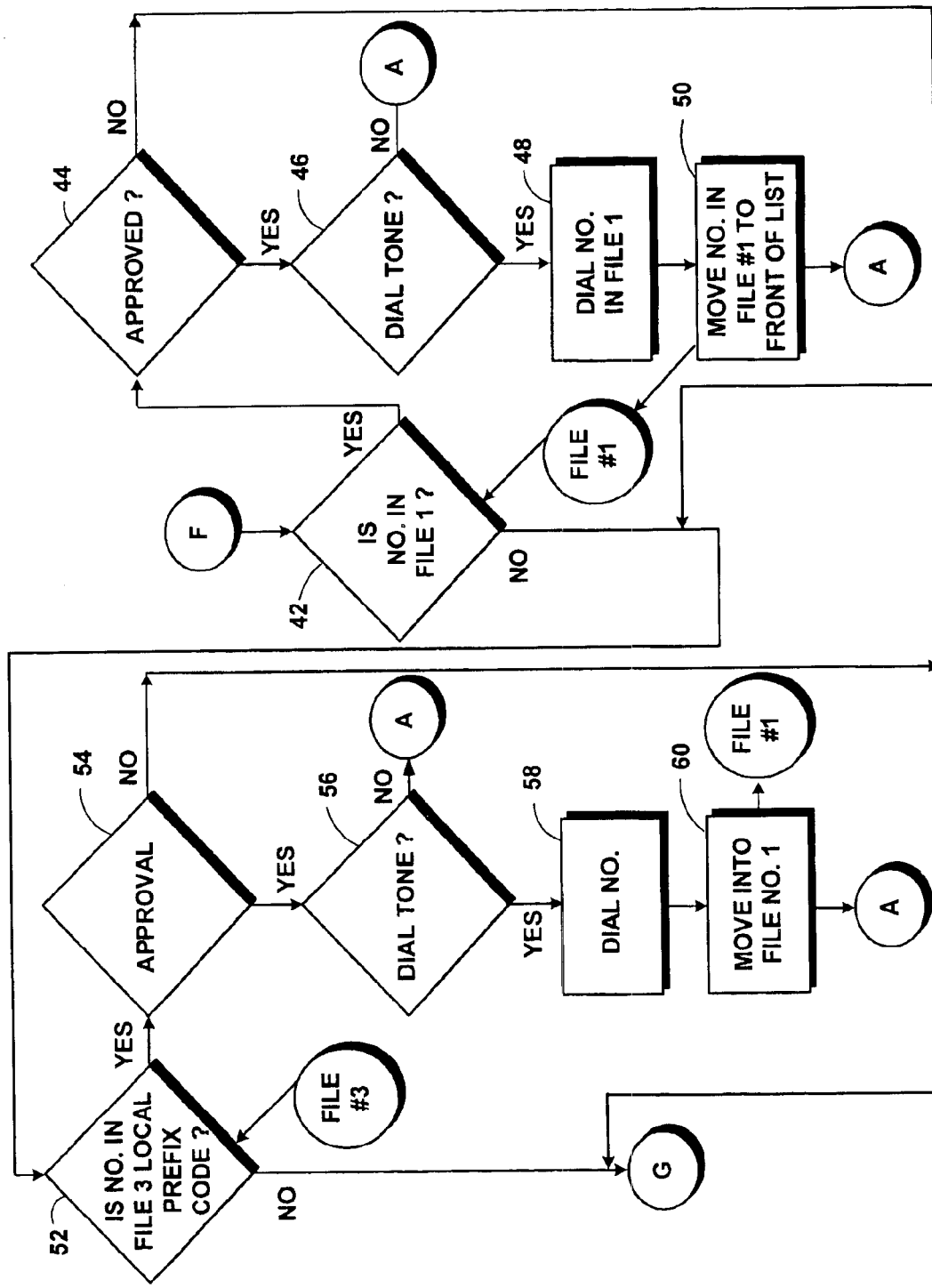

If none of the aborting events has occurred and the system recognizes in step 36 that seven digits have been dialed, the system goes to Point F, shown in FIG. 2F. Referring to FIG. 2F, the system then determines in step 42 whether the digits of the number dialed match the corresponding digits of any number in File 1, i.e., the right hand most seven digits of any number in File 1. Those skilled in the art will understand that the part of this system that matches a dialed number to the numbers in File 1 can be based on any predetermined number of digits. Preferably, the number of digits needing to be matched should be a fixed number, a fixed minimum number or a totally variable number.

One skilled in the art will also recognize that the system could be designed so that the caller dials the last four digits of a number, or the last x digits of the number, and the system dials the rest. This type of design would be particularly suitable for a large firm having four digit extensions. A person's extension might be 1111, or his direct dial number might be a 321-1111. The system could be designed so that it would recognize a four digit number, a seven digit number, a 1+ten digit number, or any x digit number.

Referring still to FIG. 2F, if the system determines in step 42 that there is a match, the system in step 44 notifies the caller of the match, which may be accomplished by displaying the corresponding area code of the matched number. The system then determines in step 44 whether the caller has approved the number to be dialed. For example, the caller might depress a key to indicate acceptance. Among the ways the caller may reject the number is by hanging up, at which time the system will abort the call at Point E and the system will return to starting Point A, or the caller may also signal the system to continue its search to File 3 and the remaining files, at which time the system will go to step 52, described below.

If the caller approves the number in step 44, the system then determines in step 46 whether a dial tone exists. If no dial tone is present, the system goes to Point A, at which time the system is ready for the dialing process to start again. Alternatively, the system may momentarily hang up and wait for the dial tone to return and then out-dial, as described below. If the system determines in step 46 that a dial tone exists, the system in step 48 then out-dials the selected number in File 1. The system in step 50 will then delete the out-dialed number from its present position in File 1 and move it to the front of File 1. After the out-dialed number is relocated, the system goes to Point A, at which time the system is ready to receive the next number that the caller dials.

If the system determines in step 42 that the seven digit dialed number does not match the right hand most seven digits of any number in File 1, or if the system determines in step 44 that the caller rejects the number in File 1 but elects to continue searching, the system will determine in step 52 whether the prefix of the seven digit dialed number (also called the NXX or exchange) matches the corresponding digits of any of the numbers in File 3, which holds all the prefixes in the caller's local area code. The prefix generally comprises the first y number of digits in the local number. In the United States, the prefix comprises the first three digits of the local number. If the prefix of the dialed number appears in File 3, i.e., there is a match, the system will advise the caller in step 54 in a manner similar to the one described above. The system then determines in step 54 whether the caller has approved the number to be dialed. As previously described, among the ways the caller may reject the number is by hanging up, at which time the system will abort the call at Point E, or the caller may also signal the system to continue its search to the next highest priority file, at which time the system will go to Point G, described below.

If the caller approves the number in step 54, the system then determines in step 56 whether a dial tone exists. If no dial tone is present, the system goes to Point A, at which time the system is ready for the dialing process to start again. Alternatively, the system may momentarily hang up and wait for the dial tone to return and then out-dial, as described below. If the system determines in step 56 that a dial tone exists, the system in step 58 out-dials the seven digit number. The system in step 60 will then add the out-dialed number to the front of File 1. After the out-dialed number is moved to the front of File 1, the system goes to Point A, at which time the system starts the process anew.

Figure 2G:
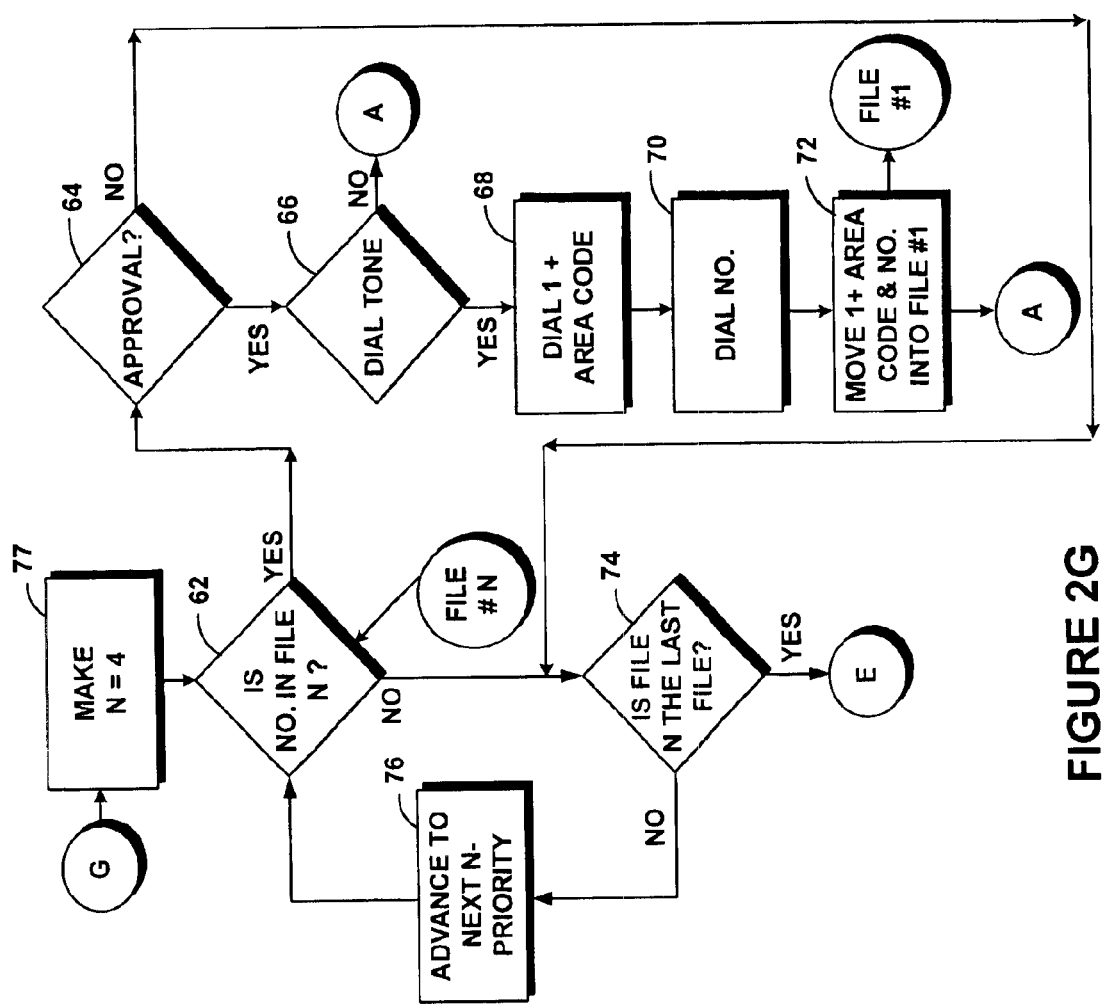

If the system determines in step 52 that the prefix of the seven digit dialed number does not match a number in File 3, or if the system determines in step 54 that the caller rejects the number in File 3 but elects to continue searching, the system will then advance to the highest priority outside area code at Point G, shown in FIG. 2G. Referring to FIG. 2G, the system determines in step 62 whether the prefix of the dialed number matches the corresponding digits of one of the numbers in File 4, which contains the respective prefixes of the highest priority outside area code. If the prefix of the seven digit dialed number appears in File 4, i.e., there is a match, the system will advise the caller in step 64 in a manner similar to the one described above. The system then determines in step 64 whether the caller has approved the number to be dialed. As previously described, among the ways the caller may reject the number is by hanging up, at which time the system will abort the call at Point E, or the caller may also signal the system to continue its search to the next highest priority outside area code file, at which time the system will go to step 74, described below.

If the caller approves the number in step 64, the system determines in step 66 whether a dial tone exists. If no dial tone is present, the system proceeds to Point A, at which time the system is ready for the dialing process to start again. Alternatively, the system may momentarily hang up and wait for the dial tone to return and then out-dial, as described below. If the system determines in step 66 that a dial tone exists, the system in step 68 then out-dials 1+ the highest priority area code and then in step 70 out-dials the seven digit number dialed by the caller. In this manner, the complete number, i.e., 1+ area code+ seven digit dialed number, is out-dialed. The system in step 72 will then add the out-dialed number, including the 1+ area code, to the front of File 1. After the out-dialed number is moved to the front of File 1, the system goes to Point A, at which time the system starts the process anew.

If the system determines in step 62 that the prefix of the seven digit dialed number does not match a number in File 4, or if the system determines in step 64 that the caller rejects the number in File 4 but elects to continue searching, the system will then advance to the next highest priority outside area code at step 74. At this point, the system proceeds through each of the N-priority outside area code files, in the same manner described above, until a match is approved, and the matched number including 1+ the area code+ the seven digit dialed number is out-dialed and stored in File 1, at which time the system will go to Point A, or until the last file has been searched without a match, at which time the system will abort the call at Point E and the system will return to starting Point A. The process may be interrupted, of course, if the caller hangs up or the line is no longer available.

Although the preferred system described above is predicated on a data base relating to area codes, one skilled in the art will recognize that other files in a data base may relate to items other than an area code. For example, if a caller needs to dial a 95 and an account code to make a long distance call through his company's PBX system, and then upon receipt of a dial tone the caller must dial a 1, the system could remember this sequence. This type of system would allow the caller to dial only the seven digit local number, or just the last four digits of the phone number, and the system would automatically dial the rest of the number.

Additionally, with cellular phone, the system could have intelligence to recognize the area from which the call originated, and if identical to the area code in the data base, the area code would be omitted even thought it was dialed. One skilled in the art will also recognize that a system similar to the one described above could be used for calls within a company or firm. For example, often a firm will have a four or five digit intercom number. The system could be designed so that after the first call to a party, only the last two digits need be dialed, and the system would supply the rest of the numbers from the data base.

One skilled in the art will also recognize that the invention can be used to operate with international calls. Rather than entering 1+ as is done for a long distance domestic call, the caller enters 011+ to identify an international call. As explained earlier, other files could be added to the data base for international calls. These international files would contain the country codes and exchanges (NXX) for a particular foreign country. Thus, if a caller commonly called the UK, and dialed the local telephone number, the device would select 011, the country code and the area code/city code for the call destination.

Additionally, it should be understood that the intent of keeping numbers in chronological order as explained in pages 7–8 is that the most commonly used numbers become the first choice if there are multiple alternatives. This system allows for the automatic entry of a new similar number that is only used once or one that ultimately becomes a most commonly used number.

There are other logical ways of creating this environment based on criteria other than the most recent call. One such way would be to create a table of al the last numbers dialed, and when there are two or more matches, select based on the number of times each alternative was used in a time period. The selection could also include a table of time lengths for each of the calls, so that the priority selection criteria could be based on the total line usage time, or a mathematical composite of a characteristic of line usage and the number of times called. These are all examples of different alternative priority criteria.

There could be a differentiation between facsimile calls and voice numbers so if someone accidentally dialed a facsimile number that was already in the lookup table, but did so for a voice call, the call either would not go through, or alternatively, it would not be an automatic selection.

Likewise, a facsimile call to a voice number would be aborted. The decision as to whether the call was a facsimile call or a voice call could be based on the characteristics of the signal transmitted after the call was answered, the recognition of a particular signal associated with a fax transmission, or the recognition of a voice, as with a syllabic detector. These methods are well known in the art.

According to another embodiment, the present invention relates to a system for automatically selecting, preparing and entering the proper supplemental information to complete an alphabetic, alphanumeric or numeric address. The system of FIG. 1A can create, maintain and utilize an internal data base in computer 4 to complete the dialed number and to form a complete address. Other systems typically employed for this purpose; including browsers and emails, such as Netscape® and Microsoft Internet Explorers®, Microsoft Outlook®, and Microsoft Outlook® Express, typically recall from a data base a pop-up list of addresses previously entered manually and maintained manually that share a unique string of alphabetic, alphanumeric and numeric addresses corresponding to a set of the dialed digits.

The term "data base" as used in this specification can reference or include one or more files, or tables related to the content of the data base. These files or tables can be physically located in multiple locations and physically connected to other computers, but can be referenced by the computer 4 in FIGS. 1A, 1B and 1C.

An address contains at least all the digits necessary to define a unique destination according to standards established by accepted procedure or authorities. A telephone number, when it includes sufficient digits to define a destination is one form of en address. A ten digit telephone number, for example, is an address, even though the leading digit "1" is omitted. In a like fashion, a seven digit telephone number could be an address, if it can be linked to a source for additional information likely to form an address.

Figure 1B:
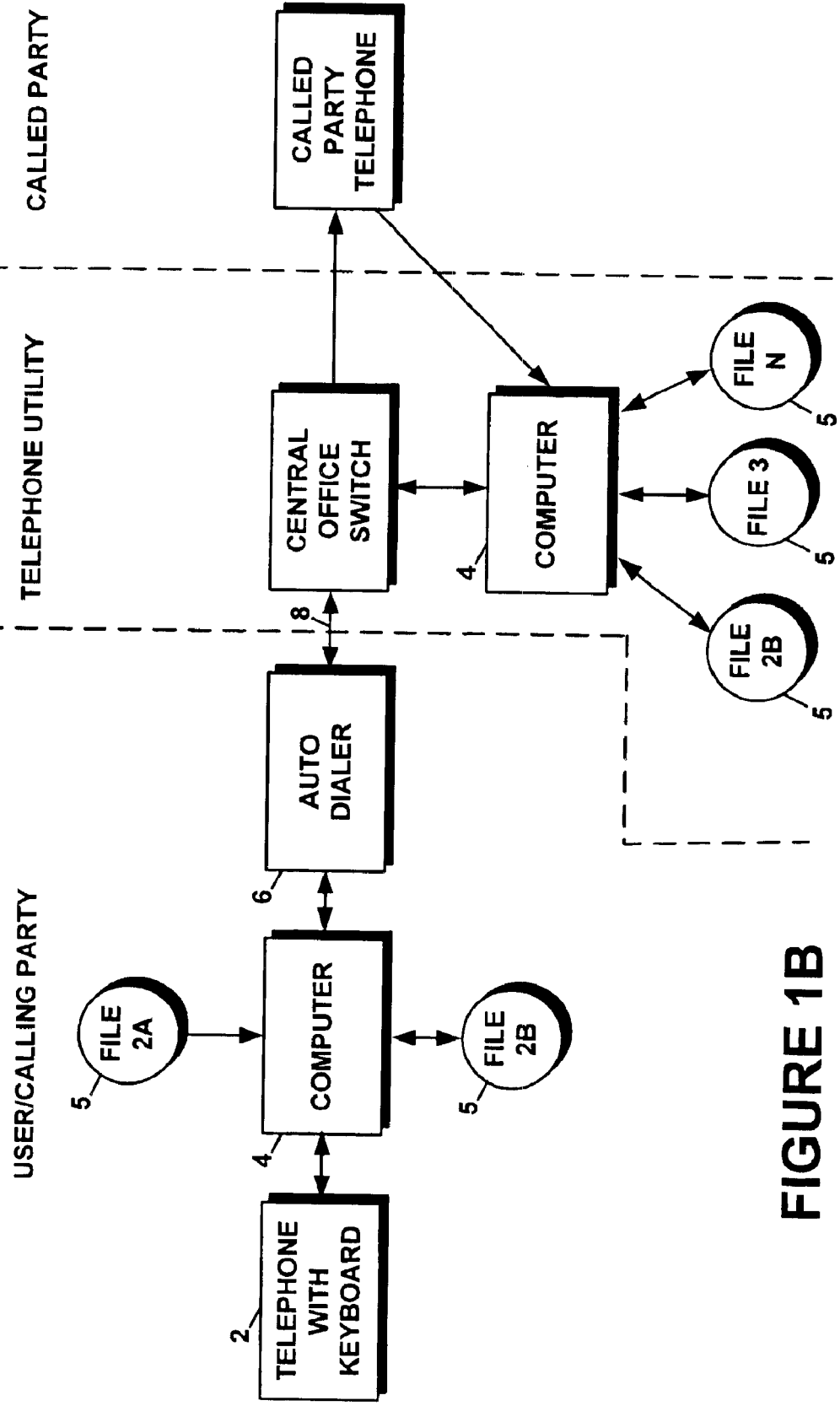
FIG. 1B is an alternative layout configuration of the system of FIG. 1A, with a distributed file and file structure in accordance with a preferred embodiment of the present invention.
Figure 1C:
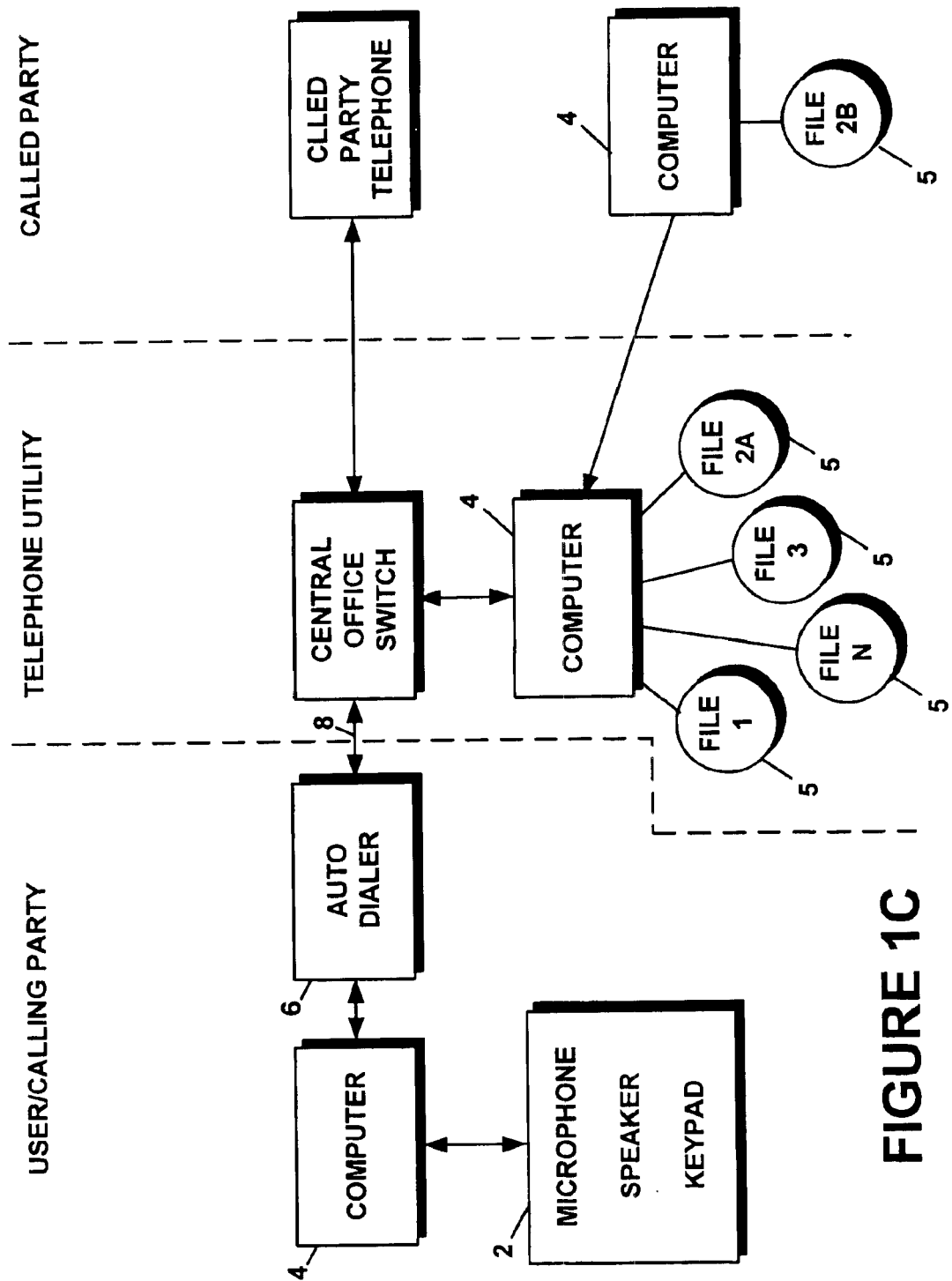
FIG. 1C is another layout configuration of the system of FIG. 1A, in accordance with a preferred embodiment of the present invention.

The systems of FIGS. 1A, 1B & 1C generally include four main elements. As explained earlier, they are: a telephone instrument 2, a computer 4; an automatic dialer 6; and a telephone line 8. A data base 5 is associated with computer 4. The system of FIG. 1A is designated by the reference numeral 1. Each of these elements, however, can be construed broadly and is rot limited to the exact designation or graphical representation.

For illustration, in one preferred embodiment exemplified in FIG. 1A, the telephone instrument 2 is understood to be a data input device and is not limited to a conventional telephone. As an example, the telephone instrument 2 could include a keypad (i.e., a computer keyboard), a voice input or a voice recognition system to convert a spoken instruction to a numeric, alphabetic or alphanumeric series of digits, or any other suitable data input device.

As another example, the telephone line 8 can be a communications path, such as an Internet connection, a LAN, a WAN, a T1, a DS3, a Centrex line, a fiberoptic cable, television cable, other broadband communications path, a wireless transmission path, such as cellular telephone and radiotelephone, or any other suitable transmission or communication path.

As still another example, the computer 4 may be multiple computers that are networked or linked together. Computer 4 is the computer or computers used to perform the functions herein described wherever located and however interconnected. The data base 5 may be distributed on multiple computers at multiple locations. In this way, one or more computers 4 could physically contain the storage devices for File 1, while the same or other computers contain the storage devices for File 2 and still other computers contain the storage devices for Files 3 through N. Files or tables in the data base could be comprised of multiple files or tables on multiple computers at multiple geographic locations. The term "dial" generally refers to entry of the digits created by keystroke, voice or otherwise by the user in communicating to the system. The term "out-dial" references transmission of an address identifying a destination or called party. In implementing a distributed system, the digits dialed by a user may or may not be the same as the digits out-dialed, or may or may not be included in the digits out-dialed to cause the caller to be switched to a destination.

In addition, one or more of the above four components may be shared or provided by a service provider. As used herein, a service provider can be an Internet service provider, a telephone service provider, a data base manager, a provider of communications computer related services, or any other provider of communications services. For example, one or more components could be resident at a telephone company central office, or be a service, or part of a service within the Internet or of a television broadcaster. It could also be provided by a television broadcaster for TV. One skilled in the art would recognize that depending on the application, the telephony dial tone or call completion signal will have counterparts including computer handshaking protocols. Likewise, one skilled in the art would recognize that suffices and switching codes such as ".com", ".org", ".gov", etc., have characteristics similar to the exchange prefix or area code of a telephone number, although following rather than preceding the dialed digits.

The files referenced herein could be maintained at various locations, and in various forms. For example, if the system of FIG. 1A were located entirely at a user's location, the stored information included in one or more of the files could be on a compact disk as illustrated by the circle designation in FIG. 1B. A service provider could regularly update the relevant files. Alternatively, files could be searched on a more central storage facility, such as a large, regularly updated data base 5 that could be employed with the systems of FIGS. 1B and 1C. In the embodiments of FIGS. 1B and 1C, for example, when searching for prefixes in File 3, a link could be made to a centrally located data base of prefixes for an entire mufti-state area.

File 2 includes addresses selected for special handling. An address selected for special handling is an address that is associated with one or more instructions such that, when the digits are out-dialed, the out-dialed address is distinguished by those instructions from addresses not selected for special handing. Examples of addresses that could be included in File 2 as addresses requiring special handling would be non-working phone numbers or phone numbers no longer in service, so that any call made to those numbers would be rejected. It could also include addresses that are redirected, so that, for example, if a caller moved and was assigned a new phone number, a call out-dialed to the old number (i.e. address) would automatically be transferred to the new number. Additionally, if the subscriber for a address changed, and the most recent call in File 1 predates the reassignment, that call could be rejected.

Calls to non-working addresses, such as addresses no longer in service, and other addresses requiring special handling can be distinguished based on the signals transmitted on the telephone line 8 to the caller distinguishing the reason for the address requiring special handling. Methods to distinguish reasons for special handling, including the use of speech recognition to interpret the voice announcements are well known to those skilled in the art.

Because certain non-working addresses and addresses no longer in service are routinely reassigned by the telephone service provider after a period of time, the computer 4 could automatically remove from the data base the restrictions for non-working addresses after that time period elapsed, such as 90 days.

The data base could contain instructions for certain addresses that need special handling. For example, File 2 could contain the phone number for the user when calling a doctor. Any call outside of the doctor's normal service hours would be automatically diverted to the phone number for a resident at the hospital. It should be understood that the data base 5 for the user could be updated at the doctor's direction. The information need not have been entered by the user who places the call, but could have been entered by the caged party, or a third party acting independently of the user. A party acting independently of the user is a party that can cause an alternate address to be linked or create a linked alternate address without approval of the user (i.e. caller).

File 2 could also contain key word cross references. The expression "key word" refers to any expression, verbal or written, that contains one or more words, numbers or a combination of words and numbers. For example, if a vanity number such as 1-417-PATENT3 was to be selected based on the entry of the digits forming the key word PATENT, File 2 would contain the cross reference. A "vanity number" represents an address that has imbedded with its digits a key word generally relevant to an addressee's use of the number. In this way, a patent law firm could advertise "dial PATENT" and information contained in File #2 would automatically convert the word PATENT into the necessary digits to complete the call. It should be dear that the word PATENT need not be imbedded in the address to be dialed, although to do so provides additional impact to the promotional effectiveness of a dialed address.

A key word system is currently available through America On Line, the conversion being made at America On Line's facilities. In the America On Line system, a company advertises an "AOL KEY WORD". An Internet user can go to AOL and only type in the AOL key word, and AOL will link or transfer the user to the complete address. Likewise, linking one Internet address to a second address, so that a user keying in one address actually is directed to another address, is another application of the Internet where a dialed address is linked or transferred to a second address. In telephony, remote call forwarding has some similar characteristics, but a complete telephone number must be dialed, and the dialed address is out-dialed to a central office where ft is linked with another complete address to be out-dialed. In the telephony example, the caller is never aware of the link the transfer or the true address.

The key word could be a spoken word. For example, a caller would say "PATENT," and File 2 would contain the necessary information to correlate or link the spoken word PATENT to the complete vanity number 417-PATENT3. Speaker independent voice recognition is available from several vendors, such as Lernout & Haupsie and Nuance. Voice recognition could interpret the word PATENT, converting it to the letters P A T E N T which would then be matched against File 2 information.

A key word can be linked by the user to an address in File 1 to be out-dialed. For example, if a phone number was to be out-dialed that had not previously been dialed, the caller could be provided an opportunity to enter a spoken or keyed key word to be stored and linked with the phone number to be out-dialed. The caller would say a word like HOME. From then on, the caller only need say HOME and a match would be made from the data base in File 1 based on the word HOME.

Cited references Kaneuchi, U.S. Pat. No. 4,945,557 and Marutiak, U.S. Pat. No. 5,568,546, describe technologies where a caller cross-references a particular address using a key word or other linked reference. In this embodiment, however, the addressee, the communications provider or a third party could establish the key word, acting independently of the caller. A party acting independently of the caller is a party that can establish one or more key words linked to an address without approval of the caller (i.e. user).

The key word need not be in any particular location within the address to be out-dialed. Thus, when the dialing is complete, the digits dialed could be referenced to any string of digits in the data base containing the digits matching the dialed digits. If the matched digits were located in File 1, there would be a low probability of having multiple matches.

In a larger data base, such as one containing all available addresses, there would likely be too many addresses containing the same key word. In such a case, either a key word would specifically need to be referenced by a service provider to the vanity number, as is the key word FLOWERS in the out-dialed number and address 1-800-FLOWERS, or the portion of the address containing the key word could be marked.

A "mark" as used herein is any indicator that can be read and interpreted by a computer. The mark or marks could be hidden in the data base so that the caller is not normally familiar of details of the mark, such as including information in the data base that FLOWERS was the key word associated with the actual telephone number 1-800-FLOWERS. The vanity number could be selected based on the location of a word within the vanity number, or the key word portion of the number could be marked in the data base by a prefix digit or digits or a suffix digit or digits. The mark or marks need not be a unique dialed digit or digits, but could be, for example, a digit as in 1-800-73TENT3, where the word TENT is the key word and the digit "3" is a mark included in the number to be out-dialed. Alternatively a mark or marks need not be dialed, as 1-800-73,TENT,3 where a non-dialed comma,",", for example, marks the beginning and end of the key word in the address. The caller only dials the number TENT, but, because of the marks associated with the number in the data base, the dialed digits, TENT are associated with the number 1-800-73TENT3. The key word could also be dialed with a mark or marks, not included in the address, such as a"*" or "#". For example, the user could dial TENT* and the system would then recognize that the entire key word TENT has been dialed. An address would then be selected to be out-dialed that corresponds to the key word TENT.

The number of digits to be matched against File 1 or File 2 could be dependent on the length of the key word in the number to be out-dialed. As an example, the key word dialed, FLOWERS, would match seven digits in the out-dialed number 1-80010 FLOWERS, and the key word dialed, TENT, would match four digits in the out-dialed number 1-800-PATENT3.

The key word could also be identified by a switching prefix. For example, the user could dial 222-TENT and the system would recognize that a key word was being dialed from the 222 prefix, and the key word was TENT. The length of the key word could be indicated by one of the digits in the prefix. For example, 224-TENT would indicate there were four digits in the key word, distinguishing the key word from TENTS, where the digits dialed would be 225-TENTS, the key word TENTS having five digits.

If a match of a fixed number of dialed digits is used in a telephone number, a match incorporating five digits is better than four because it often identifies the exchange. Whereas two different addressees to be called may have the same right hand most four digits, a is unlikely the addressees will be confused if a digit distinguishing the exchange prefix is provided.

A caller could cause to be out-dialed an address using voice in conjunction with speech recognition technologies. The actual step of dialing an address could be accomplished by the caller speaking the digits to be dialed or one or more key words. The spoken digits or one or more key words of the caller could be automatically converted to a address to be out-dialed. Before an address automatically selected by any of the methods described in this embodiment is out-dialed by the autodialer 6, the caller can be given at least a portion of the address to be out-dialed by the computer 4 and the telephone instrument 2.

One skilled in the art is familiar with commercially available technology to convert a spoken word to one or more digits. The caller acknowledges acceptance by one or more means such as by saying "accept" or entering one or more key strokes. All or a portion of the dialog between the computer 4 with the telephone 2 and the caller could be handled by voice. Alternatively, the computer 4 could provide other audio signals, such as a beep or visual signals to which the caller responds.

Examples of some of the various arrangements of the system components described herein are shown in FIGS. 1A, 1B, and 1C.

In FIG. 1A, the entire system 1 could be contained at the user's location. All files could be physically located in one computer 4.

In another arrangement, FIG. 1B, the user has a telephone instrument with a keypad, and a computer which stores File 1 and has a compact disk drive containing File 2A. File 2A contains a portion of the entire File 2. These components are communicating with the telephone company central office switch. That switch is linked to a computer and stores File 2B, representing the remainder of the information stored in File 2, as well as File 3 through File N. The called party can also add information to File 2B in this configuration if provided access.

In another arrangement illustrated in FIG. 1C, the user has a computer equipped with a microphone, a speaker and a keypad that communicates with the telephone utility central office switch. That switch is connected to a computer that stores File 1, 2A representing a portion of File 2, and Files 3 through N. A third party supplier with a computer maintains and stores File 2 B, representing the balance of File 2. The central office switch in connected to the called party address.

Although in FIG. 2A the system 1 first determines whether the sequence of dialed digits exactly corresponds to any of the restricted numbers in File 2, step 12, an alternative embodiment could first query File 1 (FIGS. 2D and 2F) and then query File 2. Similarly, it is not necessary to include every file (File 1, File 2, and Files 3 through N) to practice portions of the invention disclosed. The system could operate with only File 1, only File 2, only File 3, or only File N, although the capabilities of such a system would be correspondingly reduced.

A cellular phone user outside the home area code could enter the area code or codes of the location the user was calling from, and the area code for any phone number dialed would be appropriately changed. As used herein the "home area code" is, or includes, the area code of the address assigned to the cellular phone. For example, if the cellular phone has an address incorporating the 408 area code, made a call from the 312 area code, all calls to the 408 area code would have the 1+ 408 added to the number dialed, while calls made to the 312 area code would have the 1+312 area code deleted. The area code from where the call is being placed could be determined by the caller entering that area code, or automatically, such as by referencing a recently dialed number, referencing a data base, or based on a physical location as determined by a global positioning system. The system 1 identifies the area code that the caller is in when placing the call.

If there was a change in the area codes, all the telephone numbers in File 1, File 2, File 3 through File N, could be updated and corrected automatically. For example, for addresses in one of the files associated with the area code 312, the portion of those addresses associated with a new area code 608 assignments could be automatically cross-referenced to an area code reassignment table in the central office, and those addresses stored in File 1 and File 2 changed to be associated with area code 608. This change to the data base could be done automatically, rather than as is currently done by telling the caller the new area code so that the caller has to out-dial a second time. A similar update could be made when there is a change in the names of Internet suffices. For example, if ".com" were changed to smaller components, one of which being ".air" for all airlines, the URL address for Delta Airlines could be changed automatically from www.delta.com to www.delta.air.

While certain embodiments of the present invention have been described it should be dear that various modifications and changes may be made thereto without departing from the broader spirit and scope of the present invention. The specification, the claims, and drawings are, therefore, to be regarded in an illustrative rather than a restrictive sense.

What is claimed is:

1. A method of out-dialing an address having a plurality of digits, comprising:
   (a) initiating a call by dialing a sequence of digits representing the address to be out-dialed;
   (b) recognizing at least a port of said dialed digits, and further recognizing the sequence of said recognized dialed digits;
   (c) before the address is out-dialed, searching a data base that includes at least portions of a plurality of digits for said recognized dialed digits, and for the recognized sequence of said recognized dialed digits;
   (d) before the address is out-dialed, matching said digits and said sequence to digits in a data base of addresses requiring special handling; and
   (e) if there is no match in said data base, searching a data base that includes at least portions of a plurality of previously out-dialed addresses for said recognized dialed digits.

2. A method of out-dialing an address having a plurality of digits, comprising:
   (a) initiating a call by dialing a sequence of digits representing an address to be out-dialed;
   (b) recognizing at least a part of said dialed digits, and further recognizing the sequence of said recognized dialed digits;
   (c) before the address is out-dialed, searching a data base that includes at least portions of a plurality of previously out-dialed addresses, for said recognized dialed digits;

(d) before the address is out-dialed, automatically searching a data base of addresses that require special handling for said recognized dialed digits, and for the recognized sequence of said recognized dialed digits; and (e) before the address is out-dialed, automatically matching said digits and said sequence to digits in a data base of addresses requiring special handling.

3. A method of out-dialing a telephone number, comprising:

(a) initiating a call by dialing a sequence of digits representing the phone number to be out-dialed;

(b) recognizing at least a part of said dialed digits, and further recognizing the sequence of said recognized dialed digits;

(c) before the number is out-dialed, searching a data base that includes one or more key words established by a party independent of the caller and linked with the telephone number to be out-dialed;

(d) before the number is out-dialed, automatically matching sold dialed digits and said key words in said data base of key words;

(e) matching said dialed sequence of digits to a key word in said data base; and (f) causing said associated phone number to be out-dialed.

4. An apparatus for out-dialing an address, comprising:

a data base including at least portions of a plurality of previously out-dialed addresses;

said data base including information about a switching code for each of said previously out-dialed addresses;

a data base of addresses for a plurality of switching codes, including information about the switching code for each address;

a connection between said data base of addresses for a plurality of switching codes, and the data base of previously out-dialed addresses;

at least one-number in said data base of addresses for a plurality of switching codes matching at least one address in said data base of previously out-dialed addresses; and said connection causing said identified previously out-dialed address to be changed in said data base of previously out-dialed addresses.

5. A method of out-dialing an address having a plurality of digits, comprising:

initiating a call by speaking one or more key words corresponding to an address to be out-dialed, each address comprised of multiple digits;

recognizing at least one or more key words, and further recognizing the sequence of said recognized key words;

searching a data base that includes said one or more key words established by a party independent of the speaker, for said one or more key words corresponding to said address to be out-dialed;

matching at least a portion of said key word in said data base to said recognized one or more key words;

identifying said address to be out-dialed corresponding to one or more key words; and causing said identified address to be out-dialed.

* * * * *